US008406234B2

(12) United States Patent
Promenzio et al.

(10) Patent No.: US 8,406,234 B2
(45) Date of Patent: Mar. 26, 2013

(54) METHOD AND APPARATUS FOR PROCESSING MULTIPLE INCOMING CALLS IN A SINGLE DEVICE

(75) Inventors: Edgardo L. Promenzio, Ingleside, IL (US); Gregory G. Dykes, Flower Mound, TX (US); Miguel Ariel Wainsztein, Cordoba (AR)

(73) Assignee: Motorola Solutions, Inc., Schaumburg, IL (US)

( * ) Notice: Subject to any disclaimer, the term of this patent is extended or adjusted under 35 U.S.C. 154(b) by 268 days.

(21) Appl. No.: 12/963,058

(22) Filed: Dec. 8, 2010

(65) Prior Publication Data
US 2012/0147881 A1    Jun. 14, 2012

(51) Int. Cl.
| H04L 12/56 | (2006.01) |
| H04L 12/28 | (2006.01) |
| H04L 12/26 | (2006.01) |
| H04L 12/66 | (2006.01) |
| H04W 4/06 | (2009.01) |
| H04W 24/00 | (2009.01) |
| G06F 15/173 | (2006.01) |
| G06F 15/16 | (2006.01) |
| H04M 11/00 | (2006.01) |
| H04M 3/42 | (2006.01) |
| H04M 3/56 | (2006.01) |

(52) U.S. Cl. ............. 370/395.2; 370/229; 370/230; 370/236; 370/352; 370/252; 379/93.01; 379/201.1; 379/201.12; 379/204.01; 709/223; 709/224; 709/227; 709/228; 709/229

(58) Field of Classification Search ............ 370/395.2, 370/401, 229–230, 236, 252, 352–356; 709/223–224, 227–229; 379/93.01, 93.32, 379/100.05, 100.06, 201.1, 201.07, 201.12, 379/204.01, 355.09, 355.1
See application file for complete search history.

(56) References Cited

U.S. PATENT DOCUMENTS

| 5,636,269 | A | 6/1997 | Eisdorfer |
| 5,659,607 | A | 8/1997 | Yamada et al. |
| 6,633,635 | B2 | 10/2003 | Kung et al. |
| 7,130,912 | B2 * | 10/2006 | Nishikado et al. ............ 709/229 |
| 7,391,859 | B2 * | 6/2008 | Crockett et al. ......... 379/215.01 |
| 7,401,147 | B2 * | 7/2008 | Sikora et al. .................. 709/227 |
| 7,567,656 | B2 * | 7/2009 | Yoshitani .................... 379/93.09 |
| 8,130,930 | B2 * | 3/2012 | DeMent ................... 379/207.16 |

(Continued)

FOREIGN PATENT DOCUMENTS

| JP | 07162504 A | 6/1995 |
| KR | 1020040098229 A | 11/2004 |

OTHER PUBLICATIONS

International Search Report and Written Opinion for counterpart International Patent Application No. PCT/US2011/063515 mailed on Jun. 29, 2012.

*Primary Examiner* — Melanie Jagannathan
*Assistant Examiner* — Wutchung Chu (57) ABSTRACT

A method is disclosed for processing multiple, simultaneous incoming calls directed to a single communication device. The method includes receiving, by a proxy server associated with a called communication device, an invitation for each incoming call directed to the called communication device. The method also includes determining, by the proxy server upon receipt of each invitation, the availability of the called communication device by suspending transmission of each invitation and by sending to the called communication device an associated call initiation message for each invitation. The associated call initiation message is free of a Session Description Payload (SDP). The method further includes receiving, by the proxy server, at least one answer message from the called communication device, each answer message being associated with a selected incoming call.

17 Claims, 5 Drawing Sheets

U.S. PATENT DOCUMENTS

| | | |
|---|---|---|
| 2002/0181460 A1* | 12/2002 | Strathmeyer et al. ......... 370/389 |
| 2005/0163126 A1* | 7/2005 | Bugenhagen et al. ..... 370/395.2 |
| 2007/0140299 A1* | 6/2007 | Hofmann et al. ............. 370/486 |
| 2008/0002671 A1* | 1/2008 | Nagai ........................... 370/352 |
| 2008/0270260 A1* | 10/2008 | Porter et al. .................... 705/26 |
| 2009/0010412 A1* | 1/2009 | Carlier et al. ............ 379/208.01 |
| 2009/0157709 A1* | 6/2009 | Kruger et al. ................. 707/100 |
| 2009/0168765 A1* | 7/2009 | Samdadiya et al. .......... 370/352 |
| 2009/0179983 A1* | 7/2009 | Schindler .................. 348/14.08 |
| 2009/0285381 A1* | 11/2009 | Phelps et al. ............. 379/211.02 |
| 2009/0323581 A1* | 12/2009 | Masuda ........................ 370/315 |
| 2010/0027531 A1* | 2/2010 | Kurashima .................... 370/352 |
| 2010/0114896 A1* | 5/2010 | Clark et al. ................... 707/741 |
| 2010/0232594 A1 | 9/2010 | Lawson et al. |
| 2011/0028130 A1* | 2/2011 | Swaminathan et al. ... 455/414.1 |
| 2011/0179107 A1* | 7/2011 | Srinivasan et al. ............ 709/203 |
| 2011/0300894 A1* | 12/2011 | Roberts et al. ................ 455/521 |

* cited by examiner

METHOD AND APPARATUS FOR PROCESSING MULTIPLE INCOMING CALLS IN A SINGLE DEVICE

FIELD OF THE DISCLOSURE

The present disclosure relates generally to processing incoming calls in a communication device and more particularly to processing multiple, simultaneous, incoming calls in the communication device.

BACKGROUND

Many telecommunications applications require the creation and management of a session, where a session is considered an exchange of data between associated communication devices, such as computers and telephones. Some telecommunications sessions, for example telephone calls, are created, modified and terminated using a Session Initiation Protocol (SIP). SIP uses network hosts (called proxy servers) to which communication devices can send registrations, invitations to sessions, and other requests. In particular, the proxy servers help to, among other things, route requests to a current location of a communication device, authenticate and authorize communication devices for services, and implement provider call-routing policies.

To establish a communications session between a calling communication device and a called communication device, an SIP INVITE request is sent from the calling communication device to an associated proxy server. If the called communication device is also associated with the proxy server, the proxy server forwards the SIP INVITE request to the called communication device. If the called communication device is associated with another proxy server, the proxy server associated with the calling communication device forwards the SIP INVITE request to the called communication device through the other proxy server. The called communication device may thereafter respond to the SIP INVITE request by transmitting a response through the proxy server(s). The communications session between the calling communication device and the called communication device is established according to the SIP INVITE request and response from the calling communication device and the called communication device.

At a time when a session is being established with a first calling communication device and a called communication device, the called communication device will not be able to process a second request. For example, while the session is being established between the first calling communication device and the called communication device, if a SIP INVITE request is sent from a second calling communication device, the SIP INVITE request from the second calling communication device will be sent to, for example, a voice mail server associated with the called communication device or the proxy server may return a busy signal to the second calling communication device. As such, the called communication device is locked into addressing the first of multiple, simultaneous incoming calls. Therefore, when the called communication device is establishing a communication session with one calling communication device, a user of the called communication device is unaware of other potentially more urgent or important simultaneous incoming calls.

To make the user of the called communication device aware of multiple incoming calls, the existing SIP stack may be modified to handle multiple incoming calls simultaneously. However, this is resource intensive as each modified SIP INVITE request includes a Session Description Payload (SDP). The SIP user agent hardware will therefore have to handle a SDP for each simultaneous request. The user may also be made aware of multiple incoming calls if multiple telephone extensions are provided in a single communication device. Each incoming call may then be sent to a different extension on the communication device. This is also resource intensive as it requires additional telephony numbering resources.

Accordingly, there is a need for a method and apparatus for enabling the selection at least one of multiple, simultaneous incoming calls, on a called communication device without requiring extensive use of additional resources.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments are directed to apparatuses and methods for processing multiple, simultaneous incoming calls directed to a single communication device. The method includes receiving, by a proxy server associated with a called communication device, an invitation for each incoming call directed to the called communication device. The method also includes determining, by the proxy server upon receipt of each invitation, the availability of the called communication device by suspending transmission of each invitation and by sending to the called communication device an associated call initiation message for each invitation. The associated call initiation message is free of a Session Description Payload (SDP). Upon receipt of each call initiation message, the called communication device provides an alert about an associated incoming call. The method further includes receiving, by the proxy server, at least one answer message from the called communication device, each answer message being associated with an incoming call selected on the called communication device; and forwarding, by the proxy server, a suspended invitation to the called communication device for each selected incoming call. Upon transmitting the suspended invitation, a communications session is established between the called communication device and a calling communication device associated with the selected incoming call.

Figure 1:
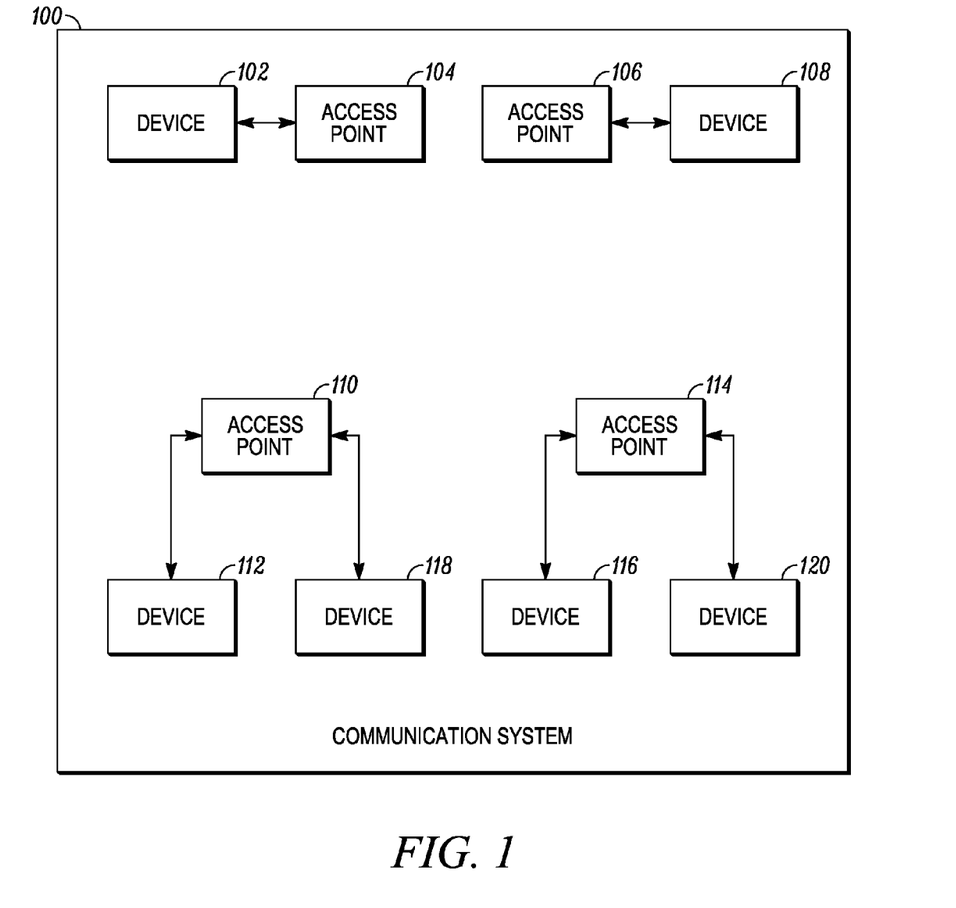
FIG. 1 is a block diagram of a communications system used in accordance with some embodiments.

FIG. 1 is a block diagram of a communication system 100 used in accordance with some embodiments. SIP messages are exchanges between two or more communication devices 102, 108, 112, 116, 118, and 220, each of which is associated with a respective proxy server 104, 106, 110 and 114. Voice and data traffic are transmitted to and from communication devices 102, 108, 112, 116, 118, and 220 which may be, for example, telephones, computers or other similar electronic devices with communication capabilities. Each SIP proxy server 104, 106, 110 and 116 facilitates session establishment and/or management on behalf of associated devices(s). As is known to those in the art, SIP is an application-layer control protocol that can establish, modify, and terminate multimedia sessions. SIP can be used with other protocols to build a complete multimedia architecture. Typically, in addition to the SIP, a complete multimedia architecture includes at least one other protocol, such as a Real-time Transport Protocol (RTP) for transporting real-time data and providing Quality of Service (QoS) feedback, a Real-Time Streaming Protocol (RTSP) for controlling delivery of streaming media, a Media Gateway Control Protocol (MEGACO) for controlling gateways to the Public Switched Telephone Network (PSTN), and a Session Description Protocol (SDP) for describing multimedia sessions. It should be apparent to one skilled in the art that the list of protocols noted above is not exhaustive. It should also be appreciated by one skilled in the art that other components for enabling communications sessions between communication devices 102, 108, 112, 116, 118, and 220 are not shown for the sake of simplicity.

SIP is based on a Hyper Text Transport Protocol (HTTP)-like request/response transaction model. In particular, each transaction in SIP includes a request that invokes a particular method/function and a response to the request. Typically, each proxy server receives SIP requests, forwards the received requests on behalf of the requestor and responds to the requestor.

For example, if a calling communication device 102 is used to place a call to a called communication device 108 using the SIP protocol, calling communication device 102 is configured to send an INVITE request to called communication device 108. Because calling communication device 102 is not likely to know the geographical location of called communication device 108 or of proxy server 106 associated with called communication device 108, calling communication device 102 sends the INVITE request to its proxy server 104. The INVITE request is an example of a SIP method that specifies the action that the requestor (calling communication device 102) wants the proxy server 104 to take. The INVITE request includes a number of header fields that provide additional information about the INVITE request. For example, the INVITE request includes a unique identifier for the call, the destination address such as a uniform resource locator (URI) for called communication device 108, and information about the type of session that calling communication device 102 wishes to establish with called communication device 108.

After proxy server 104 receives the INVITE request from calling communication device 102, it sends a Trying response back to calling communication device 102. The Trying response indicates that the INVITE request has been received and that proxy server 104 is routing the INVITE request to the destination. Proxy server 104 locates proxy server 106, possibly by performing a particular type of Domain Name Service (DNS) lookup. As a result, proxy server 104 obtains the IP address of proxy server 106 and forwards the INVITE request to proxy server 106.

In some embodiments, to determine if called communication device 108 is available to participate in the SIP session, proxy server 106 is configured to use an out-of-band signaling message to check on the availability of called communication device 108. Each out-of-band signaling message is free of a session description. In some embodiments, each out-of-band message includes a description of the message followed by a type (MESSAGE). In order to transmit the out-of-band message to called communication device 108, proxy server 106 is configured to temporarily suspend one or more INVITE requests. By suspending the INVITE requests and using the out-of-band messages, proxy server 106 can send one or more simultaneous incoming call requests to a single destination, therefore, providing a means for a preferred call to be selected on called communication device 108 from the simultaneous incoming call requests. A destination may be, for example, one or more extensions (additional telephone numbers) associated with called communication device 108 or a main telephone number for called communication device 108. Simultaneous incoming call requests are two or more incoming call requests directed to a called communication device before the called communication device establishes a connection for one call.

In particular, proxy server 106 is configured to temporarily suspend the received INVITE request and send a call initiation MESSAGE request to called communication device 108. The call initiation MESSAGE request alerts called communication device 108 to the incoming call from calling communication device 102. Upon receipt of the call initiation MESSAGE request, called communication device 108 sends an alert of the incoming call. For example, when called communication device 108 receives the call initiation MESSAGE request, it passes this information by, perhaps using an audio ring back tone, invoking an application operation on called communication device 108, or by displaying a message on a screen. Called communication device 108 also sends an indication of receipt of the call initiation MESSAGE to proxy server 106. Based on the indication of receipt, proxy server 106 sends a RINGING response to the INVITE message to calling communication device 102, wherein the response is routed through proxy server 104.

For each SIP INVITE request received by proxy server 106, it is configured to send a corresponding call initiation MESSAGE request to the called communication device. Upon receiving the call initiation MESSAGE request for each call, one or more of the simultaneous incoming calls can be selected on called communication device 108. When an incoming call is selected on called communication device 108, called communication device 108 sends an answer MESSAGE request to proxy server 106 to inform proxy server 106 that called communication device 108 is available to participate in the call session identified in the call initiation MESSAGE associated with the selected incoming call. Proxy server 106 indicates receipt of the answer MESSAGE and also forwards the INVITE request for the selected incoming call to called communication device 108.

In this example, upon receiving the INVITE request, when called communication device 108 answers the call from calling communication device 102, called communication device 108 sends an OK response to the INVITE request to indicate that the call has been answered. The OK response includes a message body with, for example, a SDP media description for the type of session that called communication device 108 is willing to establish with calling communication device 102. As a result, there is typically an exchange of SDP messages, wherein calling communication device 102 sends at least one SDP message to called communication device 108, and called communication device 108 sends at least one back to calling communication device 102. This exchange provides basic negotiation capabilities. Calling communication device 102 and called communication device 108 may then begin a media session and they can send media packets using the agreed upon format in the exchanged SDP messages.

In some embodiments, upon selecting one of the simultaneous incoming calls, those incoming calls that are not selected on called communication device 108 may immediately be taken out of the alerting state. For example, when one of the simultaneous incoming calls is selected on called communication device 108, for each non-selected incoming call, proxy server 106 sends a termination MESSAGE with an identifier of the non-selected call. This causes called communication device 108 to stop sending alerts about the non-selected incoming call. For example, upon receiving a termination MESSAGE, called communication device 108 stops sending a ring-back tone for the call associated with the termination message. In some embodiments, proxy server 106 can implement a call coverage timer to allow called communication device 108 to address the remaining non-selected calls after placing the selected call on hold. In these embodiments, one or more incoming calls can be addressed after called communication device 108 establishes a connection for the selected incoming call and places the selected incoming call on hold. Whether incoming calls are terminated immediately after another incoming call is selected or after the call coverage timer expires, the non-selected call(s) can be sent to alternate locations such as voice mail.

In addition to DNS and location service lookups, proxy servers 104, 106, 110 and 114 can make flexible "routing decisions" as to where to send a request. For example, upon receiving a busy response to an INVITE request, the proxy servers can send INVITE request to a voicemail server. Proxy servers 104, 106, 110 and 114 can also send an INVITE to a number of locations at the same time. Accordingly, if for example, a call identified in a call initiation MESSAGE request is not selected on called communication device 108, proxy server 106 is configured to return a Busy Here response to the INVITE request. Upon receipt of the Busy Here response or another response indicating that the call will not be answered on called communication device 108, proxy server 104 or 106 could forward the INVITE request to a voicemail server for called communication device 108.

Often communication devices cannot use other communications methods during processing of an inbound call INVITE request. By using the out-of-band messaging, communication devices 102, 108, 112, 116, 118, and 220 can be configured to use other communication methods, such as push-to-talk features, during receipt of incoming calls. Communication devices 102, 108, 112, 116, 118, and 220 can also be configured to address each incoming call. For example, communication devices 102, 108, 112, 116, 118, and 220 can be configured so that they are not allowed to return a response, such as the Busy Here response, which rejects an incoming call. This can be an operational benefit in environments where users are discouraged from ignoring inbound calls by simply selecting other incoming calls. It should be apparent to one skilled in the art that while the description above is directed to a called between communication devices 102 and 108, it is for illustrative purposes only, and the description is applicable to any communication devices within the system.

Figure 2:
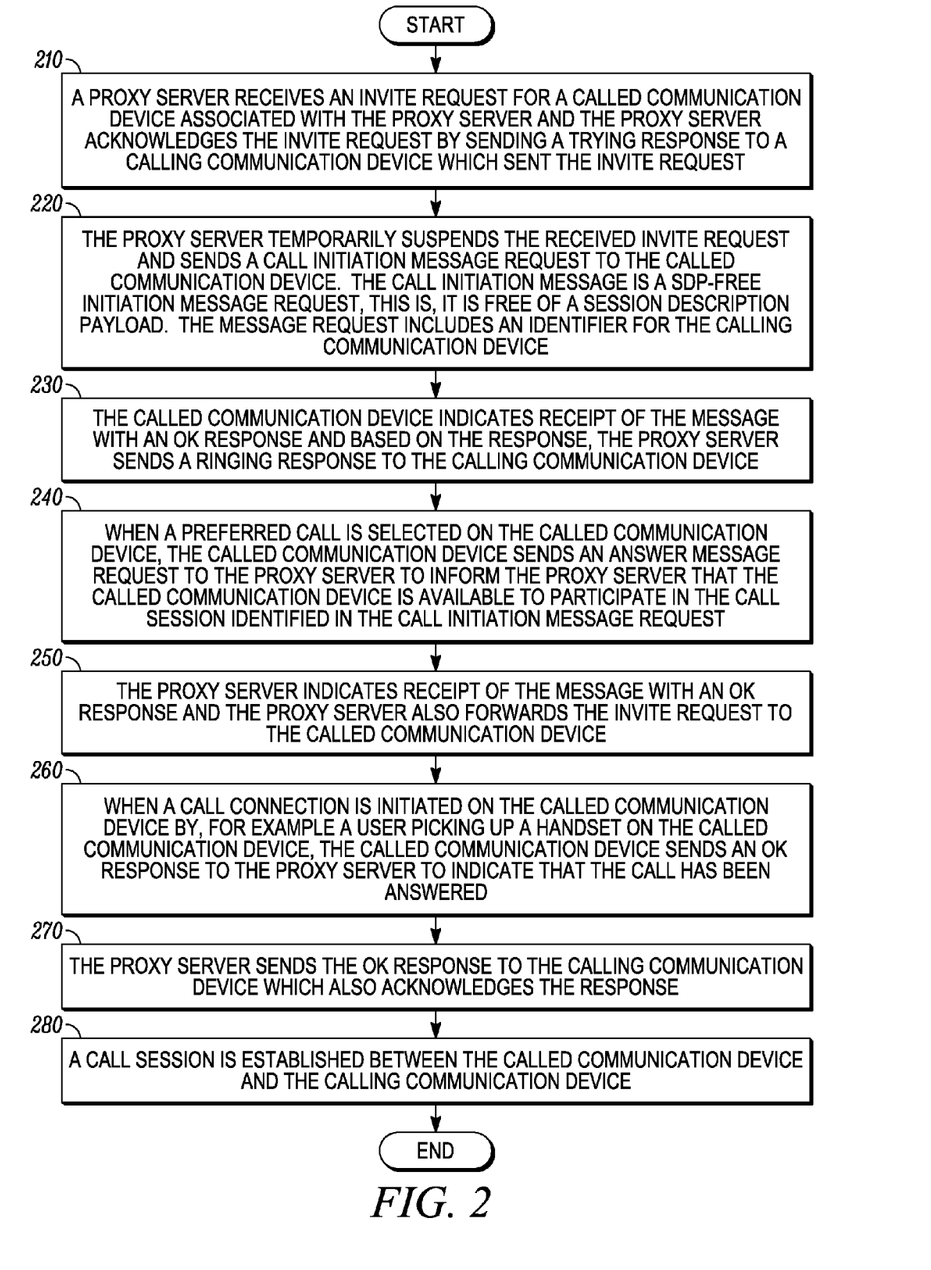
FIG. 2 is a flowchart of a method for sending a single call to a called communication device in accordance with some embodiments.

FIG. 2 is a flowchart of a method for sending a single call to a called communication device in accordance with some embodiments. In 210, a proxy server receives an INVITE request for a called communication device associated with the proxy server and the proxy server acknowledges the INVITE request by sending a Trying response to a calling communication device which sent the INVITE request. In 220, the proxy server temporarily suspends the received INVITE request and sends a call initiation MESSAGE request to the called communication device. The call initiation MESSAGE is a SDP-free initiation message request, this is, it is free of a Session Description Payload. The MESSAGE request includes an identifier for the calling communication device. In 230, the called communication device indicates receipt of the message with an OK response and based on the response, the proxy server sends a RINGING response to the calling communication device. In 240, when a preferred call is selected on the called communication device, the called communication device sends an answer MESSAGE request to the proxy server to inform the proxy server that the called communication device is available to participate in the call session identified in the call initiation MESSAGE request. In 250, the proxy server indicates receipt of the message with an OK response and the proxy server also forwards the INVITE request to the called communication device. In 260, when a call connection is initiated on the called communication device by, for example a user picking up a handset on the called communication device, the called communication device sends an OK response to the proxy server to indicate that the call has been answered. In 270, the proxy server sends the OK response to the calling communication device which also acknowledges the response. In 280, a call session is established between the called communication device and the calling communication device.

Figure 3:
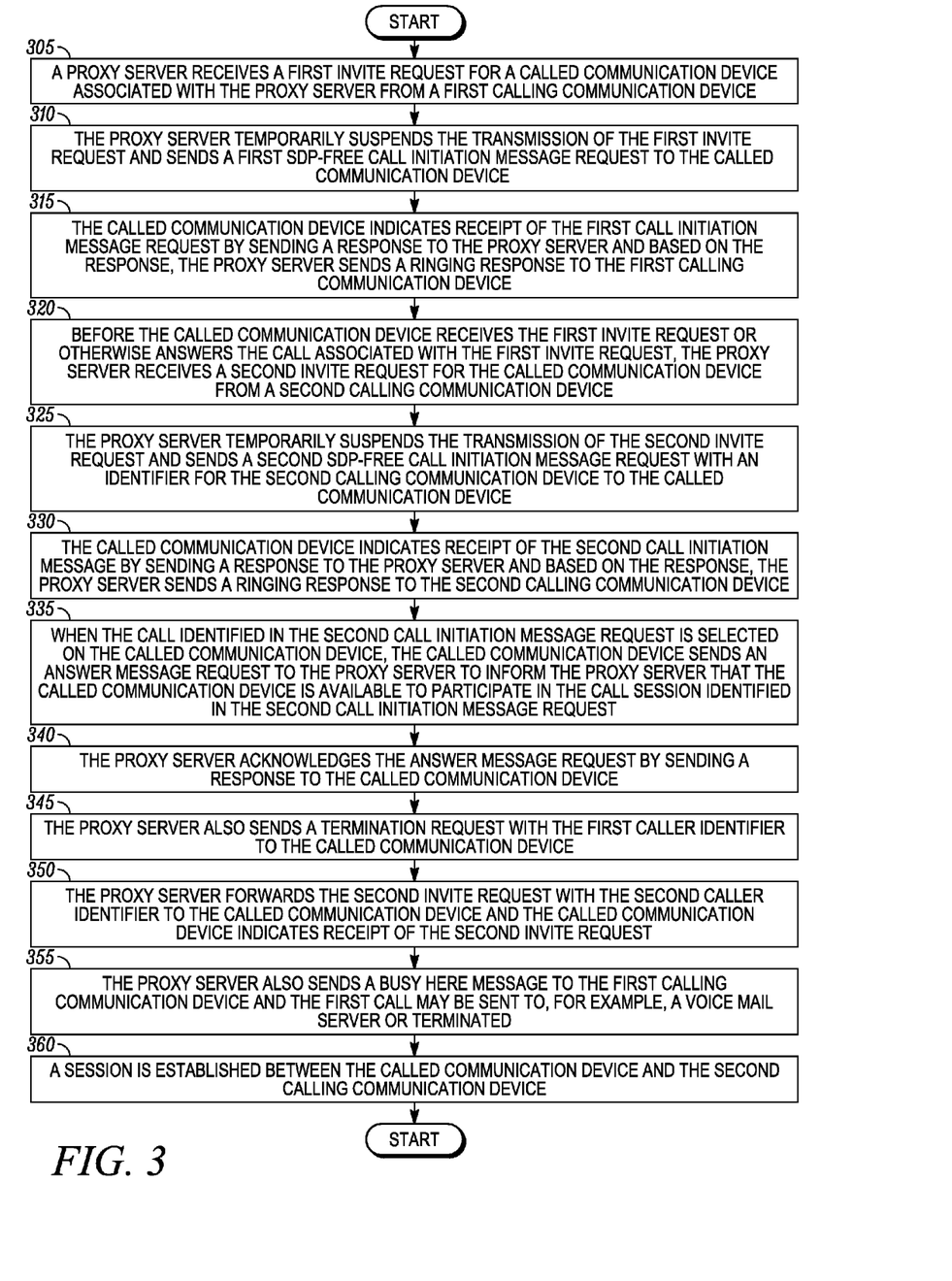
FIG. 3 is a flowchart of a method for sending multiple calls to a called communication device in accordance with some embodiments.

FIG. 3 is a flowchart of a method for sending multiple, simultaneous, incoming calls to a called communication device in accordance with some embodiments. In 305, a proxy server receives a first INVITE request for a called communication device associated with the proxy server from a first calling communication device. In 310, the proxy server temporarily suspends the transmission of the first INVITE request and sends a first call initiation MESSAGE request to the called communication device. The first call initiation MESSAFE is a SDP-free initiation message request which includes an identifier for the first calling communication device. In 315, the called communication device indicates receipt of the first call initiation MESSAGE request by sending a response to the proxy server and based on the response, the proxy server sends a RINGING response to the first calling communication device. In 320, before the called communication device receives the first INVITE request or otherwise answers the call associated with the first INVITE request, the proxy server receives a second INVITE request for the called communication device from a second calling communication device. In 325, the proxy server temporarily suspends the transmission of the second INVITE request and sends a second call initiation MESSAGE request with an identifier for the second calling communication device to the called communication device. The second call initiation MESSAFE is also a SDP-free initiation message request. In 330, the called communication device indicates receipt of the second call initiation MESSAGE by sending a response to the proxy server and based on the response, the proxy server sends a RINGING response to the second calling communication device. In 335, when the call identified in the second call initiation MESSAGE request is selected on the called communication device, the called communication device sends an answer MESSAGE request to the proxy server to inform the proxy server that the called communication device is available to participate in the call session identified in the second call initiation MESSAGE request. In 340, the proxy server acknowledges the answer MESSAGE request by sending a response to the called communication device. In 345, the proxy server also sends a termination request with the first caller identifier to the called communication device. The called communication device acknowledges the termination request and stops sending alerts about the call associated with the first call initiation MESSAGE request. In 350, the proxy server forwards the second INVITE request with the second caller identifier to the called communication device and the called communication device indicates receipt of the second INVITE request. In 355, the proxy server also sends a Busy Here message to the first calling communication device and the first call may be sent to, for example, a voice mail server or terminated. In 360, a session is established between the called communication device and the second calling communication device.

Figure 4:
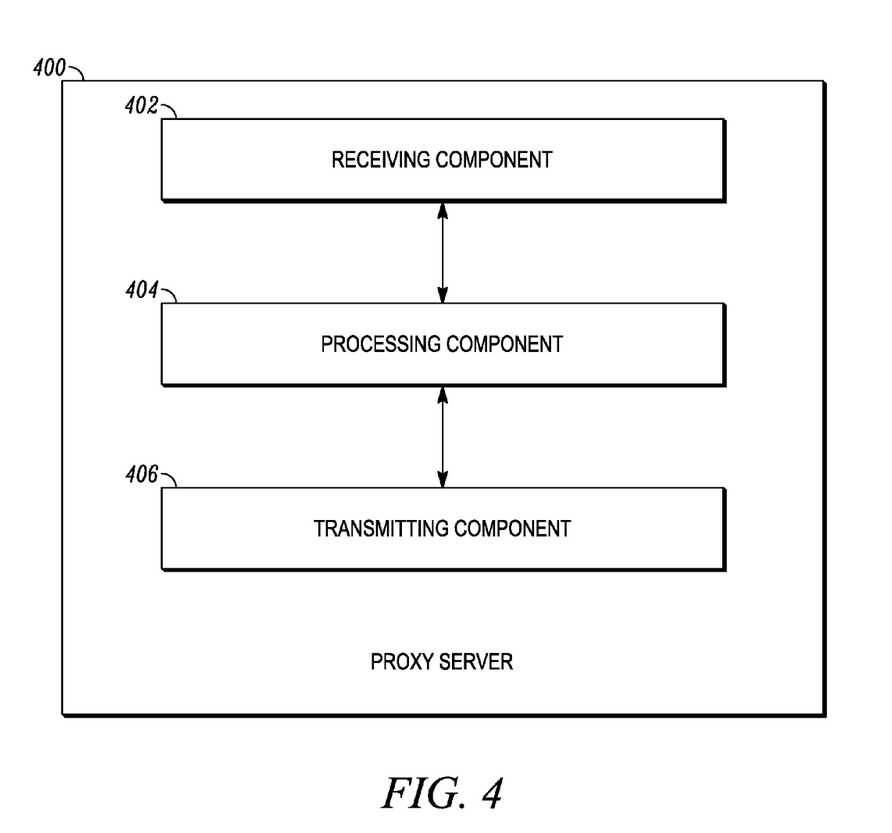
FIG. 4 is a block diagram of a proxy server used in accordance with some embodiments.

FIG. 4 is a block diagram of a proxy server used in accordance with some embodiments. Proxy server 400 is configured to process multiple, simultaneous incoming calls directed to a single communication device. Proxy server 400 includes a receiving component 402 which is configured to receive an invitation for each incoming call directed to an associated called communication device. Proxy server 400 also includes a processing component 404 which is configured to determine the availability of the called communication device by suspending transmission of each invitation and by sending to the called communication device an associated call initiation message for each invitation. Upon receipt of each call initiation message the called communication device sends alerts about an associated incoming call. Receiving component 402 is further configured to receive an answer message from the called communication device for at least one selected incoming call. Proxy server 400 further includes a transmitting component 406 which is configured to forward an associated invitation for the selected incoming call to the called communication device. Upon transmitting the associated invitation, a communications session is established between the called communication device and a calling communication device associated with the selected incoming call. It should be apparent to one skilled in the art that other components and configurations of the proxy server are not shown for the sake of simplicity.

Figure 5:
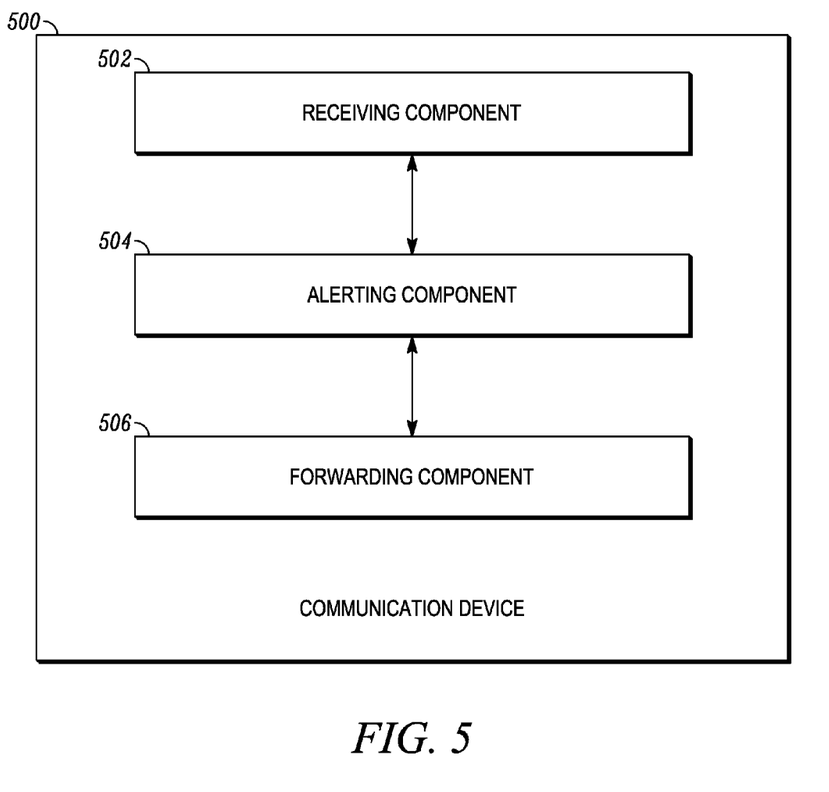
FIG. 5 is a block diagram of a communication device used in accordance with some embodiments.

FIG. 5 is a block diagram of a communication device used in accordance with some embodiments. The communication device 500 is configured to process multiple, simultaneous incoming calls and it includes a receiving component 502, an alerting component 504 and a forwarding component 405. Receiving component 502 is configured to receive a call initiation message identifying a calling communication device for each incoming call. Alerting component 504 is configured to send an alert about each incoming call associated with a received called initiation message. Forwarding component 506 is configured to forward an answer message for at least one selected incoming call. The answer message is associated with the received call initiation message. Receiving component 502 is further configured to receive an invitation for each selected incoming call, and upon receipt of the invitation, the communication device is configured to establish a communications session with the calling communication device. It should be apparent to one skilled in the art that other components and configurations of the communication device are not shown for the sake of simplicity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for processing multiple, simultaneous incoming calls directed to a single communication device, comprising:
   receiving, by a proxy server associated with a called communication device, an invitation for each incoming call directed to the called communication device;
   determining, by the proxy server upon receipt of each invitation, the availability of the called communication device by suspending transmission of each invitation and by sending to the called communication device an associated call initiation message for each invitation, wherein upon receipt of each call initiation message the called communication device is configured to send an alert about an associated incoming call;
   receiving, by the proxy server, at least one answer message from the called communication device, each answer message being associated with an incoming call selected in the called communication device; and
   forwarding, by the proxy server, a suspended invitation to the called communication device for each selected incoming call, wherein upon transmitting the suspended invitation, a communications session is established between the called communication device and a calling communication device associated with the selected incoming call; and
   directing the called communication device to stop providing alerts for non-selected incoming calls.

2. The method of claim 1, further comprising receiving a response to the associated invitation from the called communication device, forwarding the response to the calling communication device and establishing a communications session between the called communication device and the calling communication device.

3. The method of claim 1, wherein the directing comprises sending a termination message to the called communication device for each non-selected incoming call and receiving an indication of receipt for the termination message from the called communication device.

4. The method of claim 1, wherein the directing comprises:
   implementing a call timer to allow a non-selected incoming call to be selected within a predefined time period after the selected incoming call is placed on hold;
   sending, after the predefined time period, a termination message to the called communication device for each non-selected incoming call; and
   receiving an indication of receipt for the termination message from the called communication device.

5. The method of claim 1, further comprising sending terminated calls to an alternate location.

6. The method of claim 1, wherein the call initiation message, the answer message and other out-of-band messages are free of a session description payload.

7. The method of claim 6, further comprising receiving an indication of receipt from the called communication device for each out-of-band message and taking appropriate action in response to the indication of receipt.

8. The method of claim 1, wherein the called communication device is configured to send alerts about the incoming call by using at least one of an audio or visual component on the called communication device.

9. A proxy server configured to process multiple, simultaneous incoming calls directed to a single communication device, comprising:
   a processor configured to receive an invitation for each incoming call directed to an associated called communication device;
   wherein the processor is further configured to determine the availability of the called communication device by suspending transmission of each invitation and by sending to the called communication device an associated call initiation message for each invitation, wherein upon receipt of each call initiation message the called communication device is configured to provide an alert about an associated incoming call,
   wherein the processor is further configured to receive an answer message from the called communication device for at least one incoming call selected on the called communication device, and
   wherein the proxy server is configured to forward an associated invitation for the selected incoming call to the called communication device, wherein upon transmitting the associated invitation, a communications session is established between the called communication device and a calling communication device associated with the selected incoming call, and wherein the proxy server is configured to direct the called communication device to stop providing an alert about non-selected incoming calls.

10. The proxy server of claim 9, wherein the processor is further configured to receive a response to the associated invitation from the called communication device.

11. The proxy server of claim 10, wherein the proxy server is configured to forward the response to the calling communication device.

12. The proxy server of claim 10, wherein the proxy server is further configured to direct the called communication device by sending a termination message to the called communication device for each non-selected incoming call and the proxy server is further configured to receive an indication of receipt of the termination message from the called communication device.

13. The proxy server of claim 10, wherein the proxy server is further configured to direct the called communication device by:
  implementing a call timer to allow a non-selected incoming call to be selected within a predefined time period after a selected incoming call is placed on hold; and
  sending, after the predefined time period, a termination message to the called communication device for each non-selected incoming call, wherein the proxy server is configured to receive an indication of receipt for the termination message from the called communication device.

14. The proxy server of claim 10, wherein the proxy server is further configured to send terminated calls to an alternate location.

15. The proxy server of claim 9, wherein the processor is further configured to receive an indication of receipt from the called communication device for each out-of-band message and the proxy server is configured to take appropriate action in response to the indication of receipt.

16. A communication device configured to process multiple, simultaneous incoming calls, comprising;
  a processor configured to receive a call initiation message identifying a calling communication device for each incoming call;
  wherein the processor is further configured provide an alert about each incoming call associated with a received called initiation message;
  wherein the processor is further configured to forward an answer message for at least one selected incoming call, wherein the answer message is associated with the received call initiation message,
  wherein the processor is further configured to receive an invitation for each selected incoming call and upon receipt of the invitation, the communication device is configured to establish a communications session with the calling communication device, and wherein the processor is further configured to be directed to stop providing an alert about non-selected incoming calls.

17. The communication device of claim 16, wherein the communication device is further configured to provide an alert by using at least one of an audio or visual component.

* * * * *